March 10, 1964     L. GERMAIN ETAL     3,124,419
PURIFICATION OF PHOSPHORIC ACID
Filed Nov. 29, 1961     2 Sheets-Sheet 1
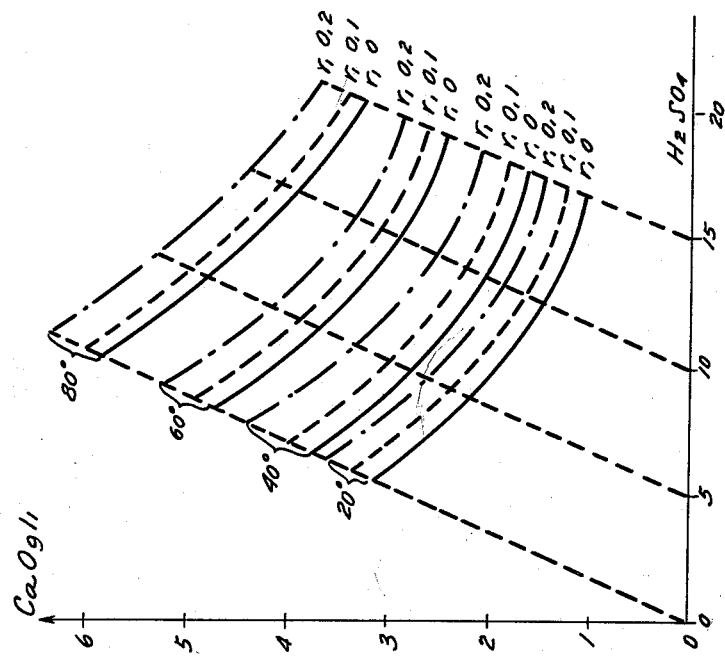
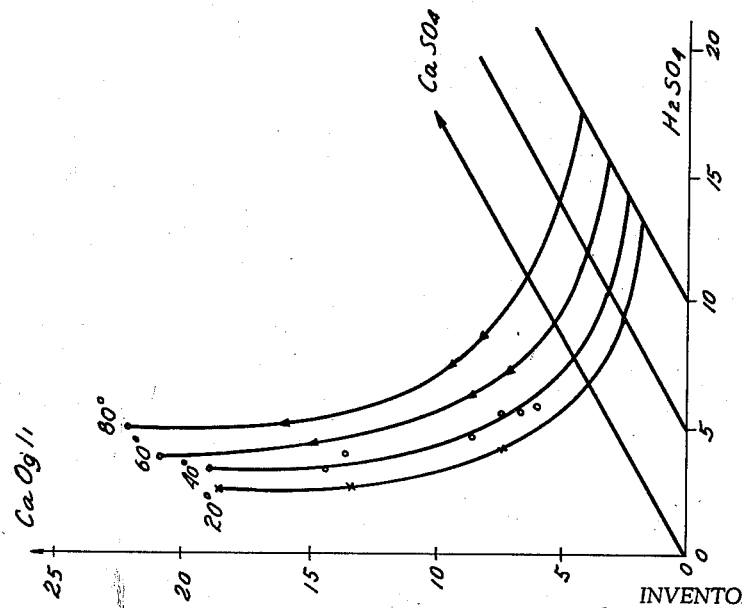
INVENTORS
LOUIS GERMAIN
PIERRE DESIRE
BY
OSTROLENK, FABER, GERB & SOFFEN
ATTORNEYS

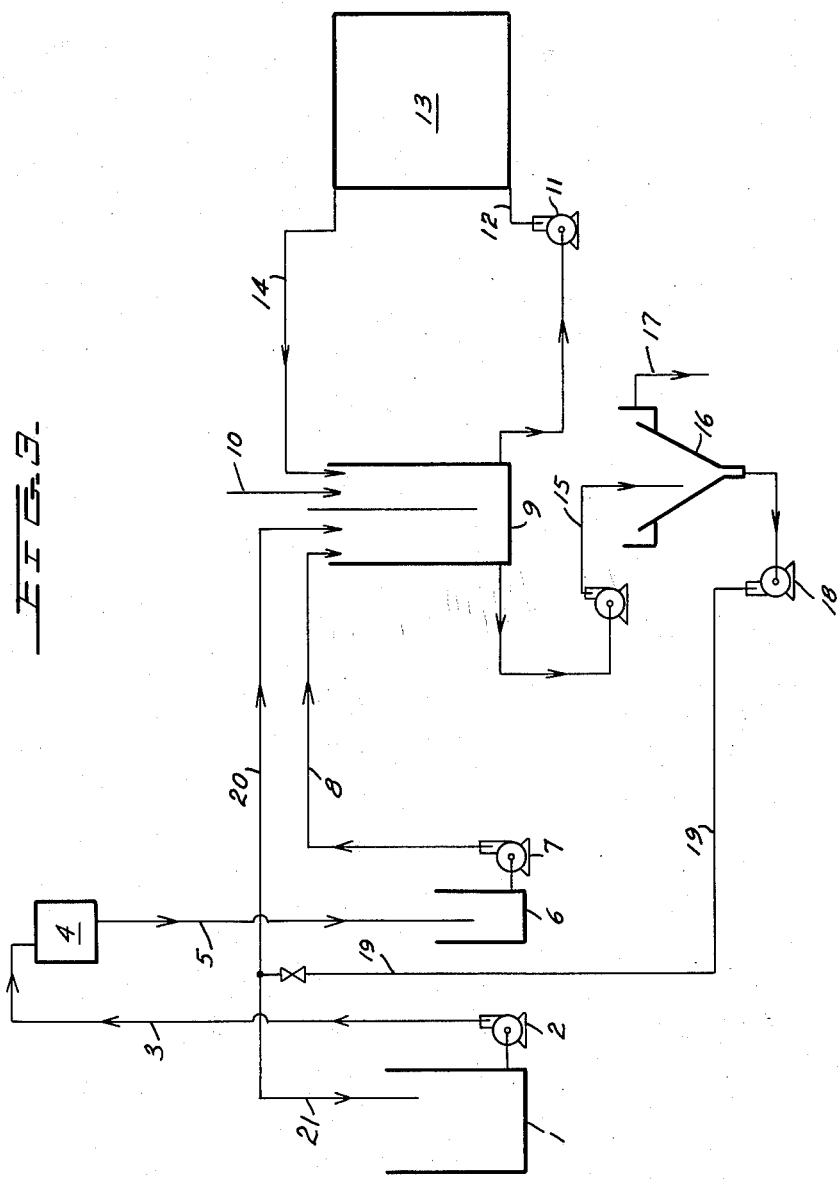

United States Patent Office 3,124,419
Patented Mar. 10, 1964

3,124,419
PURIFICATION OF PHOSPHORIC ACID
Louis Germain, Tassin, and Pierre Desire, Saint Claire-du-Rhone, France, assignors to Societe Progil, Paris, France
Filed Nov. 29, 1961, Ser. No. 155,650
Claims priority, application France Apr. 20, 1961
5 Claims. (Cl. 23—165)

The invention relates to a novel process for producing aqueous solutions of phosphoric acid. It particularly relates to improvements of the method which involves the treatment of natural calcium phosphate with aqueous sulfuric acid. One object of the present invention is to provide a method for obtaining phosphoric acid solutions purer than those obtained directly by the known method.

It is known that the treatment of pulverulent apatite with an aqueous solution of sulfuric acid results in the deposit of calcium sulfate and a solution of phosphoric acid which generally contains 250 to 450 grams of $P_2O_5$ per liter. The phosphoric acid solution contains various impurities such as organic compounds, of arsenic, calcium, aluminum, magnesium, iron, and particularly fluosilicic and sulfuric acid.

As the treatment of natural calcium phosphate requires an amount of sulfuric acid in excess of that which would be theoretically necessary for transforming all the calcium present in the phosphate rock into $CaSO_4$, the proportion of $H_2SO_4$ in the phosphoric acid produced is rather high. Another reason for the abundance of impurities is the fact that the solutions, in view of their high viscosity, must be filtered at elevated temperature, generally at about 70° C. to 95° C., and at these elevated temperatures calcium sulfate becomes more soluble and remains in solution.

As a result, the solutions of phosphoric acid, prepared by the above-mentioned economical known method, are suitable only for uses which can tolerate a significant proportion of impurities, as in the production of fertilizers such as triple superphosphate. On the contrary, alkali phosphates, such as sodium phosphates, pyrophosphates, tripolyphosphates, etc., of adequate purity, cannot be produced directly from such solutions of phosphoric acid after neutralizing the solution with an alkaline base; the acid solution must be first purified. For this reason several purification methods of the crude phosphoric acid solutions have been proposed.

The most common one consists in concentrating the solution in order to evolve hydrofluoric acid together with water vapor; calcium sulfate is then precipitated by cooling. However, this method is expensive and has technological difficulties. Another process eliminates a portion of the $SO_4$ ions by cooling, but it is not practical because the precipitation of calcium sulfate is extremely slow. Moreover, this compound has the tendency of scaling the surfaces of heat exchangers. A more complete desulfonation can be obtained by treating the phosphoric acid solution with barium carbonate, but this reagent is expensive, and the separation of the very fine particles of precipitated barium sulfate is difficult. On the other hand, the solubility of the latter in the solution is substantial.

It has been known in the fabrication of alkaline phosphates to neutralize stepwise the three acid functions of $H_3PO_4$ in order to precipitate the major part of fluorine in the form of an alkaline fluosilicate.

Ion exchangers have also been applied for the purification. Electrolysis, in the presence of copper salts or oxidizing agents, has been used for eliminating arsenic. Organic solvents were employed for extracting the phosphoric acid from the impure solutions.

The various prior art methods of purification are often imperfect and always very expensive. As a result, hydrofluoric acid has been substituted for sulfuric acid in the treatment of natural phosphate.

The present invention brings improvements which permit the use of the economical known treatment of rock phosphate with sulfuric acid, while phosphoric acid solutions of considerably improved purity are obtained in a most economical fashion. The present process does not use costly reagents, does not involve losses of $P_2O_5$, does not produce corrosion or scaling, and is operated without involving the considerable expenses of evaporation or deep cooling. The present process is carried out in very simple and inexpensive apparatus. This process makes it possible to produce aqueous solutions of phosphoric acid containing less than 5 g. of $H_2SO_4$ per liter and no more than 1 g. per liter of fluorine instead of more than 7 g. per liter which are present in crude solutions. Thus the acid obtained may be used to produce phosphates of alkali metals.

The process of the present invention comprises treating a natural calcium phosphate with an excess of an aqueous solution of sulfuric acid at elevated temperature and then precipitating the excess of sulfuric acid by the addition of a calcium compound in the presence of a precipitating agent while cooling.

Preferably, the new process comprises the following steps: first, treating a powder of natural calcium phosphate with a stoichiometric excess of aqueous sulfuric acid; separating the aqueous solution of the phosphoric acid product from the precipitate formed by the reaction; adding to said solution an amount of a calcium compound at least equal to the quantity of the same which stoichiometrically corresponds to the excess of sulfuric acid present; also adding to said solution a substatial amount of crystalline calcium sulfate; mixing the calcium compound and the calcium sulfate with the solution and cooling the suspension thus obtained; and separating liquid from suspended solids when the formation of a precipitate has ceased.

According to a preferred form of the invention, the first step, that is the reaction of the phosphate rock with aqueous sulfuric acid, is carried out in the presence of alkali metal cations, particularly sodium or potassium. When such cations are present in the solution, most of the fluorine is formed into an insoluble compound, instead of remaining in solution.

According to this preferred embodiment, the amount of alkali metal cations in the solution is at least equal to the stoichiometric valve based on the fluorine contained in the phosphate treated; this minimum proportion can be expressed, in the case of sodium, by the ratio $Na/P=0.08$. Preferably, the alkali metal cation is present in excess of the stoichiometric amount. The amount of the cation may reach, for example, 5 or 6 times the stoichiometric amount, and best result are obtained when it is between 1.9 and 3.8 times said amount; the latter range corresponds to a weight ratio of $Na/P$ of 0.15 to 0.30.

The alkali metal cation may be introduced into the solution, in which the phosphate is treated, in various forms, e.g. as sodium or potassium salts, preferably sodium or potassium sulfate or phosphate. It is particularly advantageous to employ a sulfate or bisulfate which spares $SO_4^=$ ions of the sulfuric acid used.

When the cation is used in excess, it remains in solution in the phosphoric acid produced. This is advantageous if the solution is later used for preparing a phosphate of the corresponding alkali metal.

On the other hand, the presence of the alkali cation has little influence at moderate temperatures, on the solubility of calcium sulfate. It therefore does not disturb the precipitation of the excess of $H_2SO_4$ by the addition of a calcium compound and of a precipitating agent.

The relationship of the solubilities of the compounds of the solution is explained by FIGURES 1 and 2 in which the total solubility of $SO_4^=$ ions is represented, in grams of $H_2SO_4$ per liter, as a function of the calcium ion content expressed as grams of CaO per liter.

In FIGURE 1, the solubility diagram has been established for 20°, 40°, 60° and 80° C. for an aqueous solution having 300 grams of $P_2O_5$ per liter, 20% of the $P_2O_5$ being in the form of monosodium phosphate. Above the arrow designated "$CaSO_4$" the ratio $H_2SO_4/CaO$ in the solution is less than 1.75; below the arrow said ratio is greater than 1.75.

In FIGURE 2, for each of the temperatures 20°, 40°, 60° and 80° C., three solubility curves have been drawn corresponding respectively to 3 different ratios $f_1$: 0–0.1–0.2, where $f_1$ is the molecular ratio $Na_2O/P_2O_5$ in the solution.

In the first step of the present process the calcium phosphate rock is preferably used in the form of a rather fine powder having a grain size of, for example, 50 to 500 microns. The powder is mixed with 1000 to 2000 liters of water and 850 to 1000 kg. of a sulfuric acid having 1500 to 1300 g. $H_2SO_4$ per liter, per ton of phosphate. The water used preferably contains phosphoric acid washing liquors coming from a preceding step.

The preferred proportion of $H_2SO_4$ is such that an excess of 10 to 50 g. of sulfuric acid remains per liter of final solution. As explained above, it is preferable to also add the required amount of an alkali metal salt, for example, sodium sulfate or phosphate. As the reaction is exothermic, the solution heats up to about 80° to 90° C. It is preferable not to exceed 90° C., but, as a rule, the reaction may be performed between 50° and 110° C.

At the end of this treatment, the aqueous solution obtained is separated from the precipitate formed and from the residues of the reaction by known means, such as filtration or settling in the heat.

A seed of calcium sulfate is added to the solution obtained when still hot, generally at a temperature of the order of 70° C. The seed is preferably a mixture of calcium sulfate and alkali metal fluosilicate, the latter having been formed in the first operating step when the reaction of the mineral phosphate has been carried out in the presence of a salt of an alkali metal.

The amount of the seed should be a rather large one, preferably more than 50 g. of solids per liter of solution. Best results are obtained when the seed amounts to 60 to 100 g. of solid per liter.

An adequate amount of a calcium compound, such as lime, calcium carbonate or tri-basic calcium phosphate, is introduced into the solution; the amount is based on the excess of sulfuric acid present in the solution. A particularly advantageous embodiment of the invention uses a quantity of the same pulverized calcium phosphate which is used in the reaction step. This mode of operation is very economical, and results in the acceleration of the precipitation of calcium phosphate from the solution.

The suspension thus obtained, which contains the calcium compound for the precipitation of $SO_4^=$ ions of the precipitating agent, is stirred and cooled, and under these conditions, calcium sulfate rapidly precipitates.

It is not necessary to cool the suspension to a low temperature; the temperature may be between 0 and 50° C. and preferably between 10 and 40° C. The calcium sulfate to be eliminated precipitates completely within about 1 to 3 hours. This is remarkable because, as is known, this compound generally precipitates very slowly when it is not operated as set forth above. In the absence of the above agent, the precipitation of calcium sulfate in the solution can take several weeks.

At the moment when the precipitation has ceased in the suspension, the purified solution of phosphoric acid can be separated from the solids of the suspension by any known procedure, say, settling, filtration or centrifugation.

The separation of certain particular impurities such as arsenic, organic compounds, etc., may be performed by the addition of specific reagents to the suspension simultaneously with the precipitation of calcium sulfate in the presence of the precipitating agent. For example, an alkali metal sulfide may be introduced into the suspension at the same time as said agent and said calcium compound; then arsenic sulfide precipitates together with calcium sulfate.

According to one of the preferred modes of carrying out the invention, the amount of calcium compound, used for precipitating the excess of $H_2SO_4$, is such that the weight ratio $H_2SO_4/CaO$ in the solution treated approaches or equals 1.75.

According to another mode of carrying out the invention, particularly appropriate when a somewhat increased content in $Ca^{++}$ is harmless to the intended use for the phosphoric acid solutions, the amount of calcium compound employed for the precipitation is higher, so that the weight ratio $H_2SO_4/CaO$ in the solution is less than 1.75. This ratio may be lowered down to 0.5, for example, and then the $H_2SO_4$ remaining in the solution decreases while a certain increase in calcium ions takes place (see on FIG. 1, the part of diagram situated above the arrow marked $CaSO_4$).

In a variation of the invention, the precipitation of the excess of sulfuric acid may be carried out directly in the suspension which results from the reaction of rock-phosphate powder with aqueous sulfuric acid, without previously separating clear liquid from the suspension. It suffices then to add to the suspension the required amount of lime, of calcium carbonate or tri-basic calcium phosphate, and to cool it while stirring. The crystals of $CaSO_4 \cdot 2H_2O$ and $Na_2SiF_6$, present in the suspension, act as precipitating agent. However, it is generally preferred to effect the precipitation in a clear liquid, previously separated from the above mentioned suspension.

The invention is illustrated but is not to be limited by the following examples.

EXAMPLE 1

An aqueous phosphoric acid solution having 340 g. $P_2O_5$ per liter is produced in an installation shown by the flow sheet of FIG. 3.

Into vessel 1 is introduced 1000 kg. of powdered apatite containing 75% $Ca_3(PO_4)_2$. 98% of the powder comprises particles of no more than 0.5 mm. size, while 30% is less than 0.08 mm. The powder is mixed with 1300 liters of water containing about 150 g. $P_2O_5$ per liter which comes from the washings of a preceding operating run. To the mixture is added 950 kg. sulfuric acid of specific gravity 1.71, i.e. 740 kg. $H_2SO_4$, and 110 kg. of anhydrous $Na_2SO_4$.

The suspension thus obtained is stirred for 10 to 20 hours, while the exothermic reaction raises the temperature up to 90° C. which is maintained during the stirring. As the attack on the apatite ends, the slurry obtained is transferred, with pump 2, by conduit 3, into filter 4; from the latter, a crude phosphoric acid solution at about 80° C., goes out through pipe 5 into the intermediate vat 6.

In this way 1000 liters of a solution having 335 g. $P_2O_5$, 20 g. $H_2SO_4$, and 4 g. F per liter in the form of sodium fluosilicate, were obtained within the vat 6.

The solution is removed by pump 7 and introduced, through pipe 8, into the container 9 which is provided with a stirrer; it is added to a mud of calcium sulfate dihydrate and sodium fluosilicate precipitated in a preceding run; the mud is pumped through line 20 from the bottom of thickener 16; the amount of mud introduced into the container 9 is controlled in order to have 80 g. of solid material of the mud suspended per liter of the solution within container 9.

While stirring the contents of container 9, an amount of 15 to 20 kg. of the apatite powder used as the starting material is added to the stirred solution to form a suspension. The latter is cooled by circulating it through heat exchanger 13 which communicates with the container 9 through conduits 12 and 14 and pump 11.

The temperature of the suspension within container 9 is dropped from 70° C. down to 30° C. at the end of operation.

After 2 hours of stirring the excess of $SO_4^=$ ions in the crude phosphoric acid solution are precipitated in the form of non-scaling, well-crystallized $CaSO_4.2H_2O$. As seen, solubility equilibrium is rapidly reached, while no scale is formed either within container 9, conduits 12—14, pump 11, nor on the exchange surfaces of heat exchanger 13.

The suspension is then transferred from container 9, through 15, into thickener 16, from which clarified liquid, that is a purified solution of phosphoric acid, runs out through 17. Mud constituted mainly of calcium sulfate and sodium fluosilicate is taken away by means of pump 18. A portion of the mud is recycled into container 9 for serving as precipitating agent in a further operation; the remainder of it is pumped through line 21 into the attack vessel 1, where the mud is brought together with the solid residues of the acid attack of rock-phosphate; then the filter 4 serves to separate and wash this mud and these residues. Of course, when an operation is carried out within container 9 for the first time, the precipitating agent may be a portion of the solids separated on filter 4.

In the present example, the solution drawn out at 17, contained only 7 g. $H_2SO_4$ and 1 g. F per liter. This is an important improvement over known processes, as the impurity content of the solution in g./l. has been considerably diminished:

|  | $P_2O_5$ | $H_2SO_4$ | F |
|---|---|---|---|
| Solution obtained in vessel 1 | 335 | 20.4 | 4 |
| Solution purified by precipitation (container 9) | 340 | 7 | 1 |

The purified solution is useful in the preparation of ortho, pyro, or other alkali metal phosphates; after neutralization and filtration, the solution may be used directly for feeding crystallizers-atomizers or furnaces for the production of the above solid phosphates; the content in $P_2O_5$ is then affected only by a very reduced amount of $SO_4^=$.

EXAMPLE 2

Operations similar to those of Example 1 are performed, but to the suspension within container 9 is added 2.5 g./l. of sodium sulfide in order to remove arsenic. This impurity now separates easily in the form of arsenic sulfide which is included in the mass of precipitated calcium sulfate. The concentration of arsenic drops from 30 p.p.m. to about 1 p.p.m.

EXAMPLE 3

In the course of the operation described in Example 1, an absorbent such as bentonite is added to the suspension of container 9, in the amount of about 8 g. per liter, while cooling the suspension. As a result, organic matters coming from the natural phosphate, are absorbed at the same time as the excess of $SO_4^=$ ions is eliminated.

EXAMPLE 4

In the first step, that is during the attack of apatite, as described in Example 1, the addition of sodium sulfate is replaced by that of a stoichiometrically equivalent amount of potassium phosphate.

EXAMPLE 5

The thickener 16, represented on FIG. 3, is replaced by a filter. The solids of the suspension coming from container 9 separate very satisfactorily without clogging the filter.

EXAMPLES 6, 7, 8, 9 and 10

In the following table, the results of 5 examples of carrying out the present process with variable excesses of sulfuric acid and variable proportions of calcium oxide used for precipitating $SO_4^=$ ions are listed. The examples concern preparation of phosphoric acid solutions of different strength. The result is obtained in Example 7, by the use of 13.55 g./l. CaO instead of 8.55 (line VI) and in Example 9 by the use of 29 g. against the 22.8 g. which would correspond stoichiometrically to the 40 g. of free $H_2SO_4$ present.

Table

|  | Examples No. | | | | |
|---|---|---|---|---|---|
|  | 6 | 7 | 8 | 9 | 10 |
| I. $P_2O_5$ g./l. | 300 | 350 | 390 | 420 | 420 |
| II. Temperature of reaction of apatite with $H_2SO_4$, °C | 80 | 80 | 80 | 90 | 90 |
| III. g./l. in the crude solution obtained by the reaction, free $H_2SO_4$ | 15 | 15 | 15 | 40 | 20 |
| IV. g./l. in the crude solution obtained by the reaction, $CaSO_4.2H_2O$ | 9.7 | 9.7 | 9.7 | 3.5 | 12.3 |
| V. g./l. in the crude solution obtained by the reaction, total $H_2SO_4$ | 20.5 | 20.5 | 20.5 | 42 | 27 |
| VI. $Ca^{++}$ ions, in CaO, g./l. used for the precipitation of $SO_4$ in excess | 8.55 | 13.55 | 8.55 | 29 | 11.45 |
| VII. Temperature at the end of precipitation, °C | 40 | 40 | 20 | 40 | 10 |
| VIII. Expressed in CaO, g./l. in the purified solution obtained, $CaSO_4$ | 4.3 | 2.8 | 3.7 | 2.6 | 3.2 |
| IX. Expressed in CaO, g./l. in the purified solution obtained, $Ca(PO_4H_2)_2$ | 0 | 5 | 0 | 6.15 | 0 |
| X. Concentrations in g./l. in the purified solution, free $H_2SO_4$ | 0 | 0 | 0 | 0 | 0 |
| XI. Concentrations in g./l. in the purified solution, $CaSO_4.2H_2O$ | 13.2 | 8.6 | 11.4 | 7.9 | 9.9 |
| XII. Concentrations in g./l. in the purified solution, total $H_2SO_4$ | 7.5 | 4.9 | 6.5 | 4.5 | 5.6 |

The precipitation is carried out within container 9 as explained in Example 1, by introducing therein a predetermined amount of lime.

The lines III, IV and V of the table set forth the contents of free $H_2SO_4$ (III), of $CaSO_4.2H_2O$ (IV) and of total sulfuric compounds expressed as $H_2SO_4$ (V) in the crude solution formed by the reaction in vessel 1.

Line VI shows the amounts of lime added to the crude solution. The temperatures to which the solution has been cooled during the precipitation are given on line VII.

Calcium sulfate and monocalcium phosphate, present in the purified solution, i.e. after the precipitation effected within container 9 are expressed as CaO, in grams per liter, respectively, on lines VIII and IX.

Line XI contains the concentrations of gypsum ($Ca.SO_4.2H_2O$) in the purified solution.

The important factor, which is the content in $SO_4^=$ ions in the purified solution, is given on line XII in grams total $H_2SO_4$ per liter of the phosphoric acid solution which is produced; as seen it can drop to less than 5 g./l.

This result is obtained in Example 7 by the use of 13.55 g./l. CaO instead of 8.55 (line VI), and in Example 9 by the use of 29 g. against the 22.8 g. which would correspond stoichiometrically to the 40 g. of free $H_2SO_4$ present.

Although preferred forms of this invention have been disclosed, it will now be apparent to those skilled in the art that many modifications and variations may be made, and it is preferred therefore to be limited, not by the specific disclosure herein, but only by the appended claims.

We claim:

1. In a process for the manufacture of phosphoric acid comprising reacting calcium phosphate with an aqueous solution of sulfuric acid to produce a suspension of calcium sulfate in phosphoric acid containing from 250 to 450 grams of $P_2O_5$ per liter, the sulfuric acid being reacted in excess such that said suspension contains from 10 to 50 grams per liter of sulfuric acid, the improvement comprising purifying said phosphoric acid by separating a phosphoric acid containing solution from the calcium sulfate precipitated during the reaction;

admixing said solution with (1) a calcium compound the calcium sulfate precipitated during the reaction; in an amount at least equal to the stoichiometric quantity required for reaction with the sulfuric acid present in said solution to produce calcium sulfate, and (2) a precipitating agent comprising crystalline calcium sulfate dihydrate in an amount of at least 50 grams per liter of said solution;

agitating the resulting mixture and simultaneously cooling the same to temperatures within the range of from 0° to 50° C. to precipitate calcium sulfate therefrom; and separating the resulting purified aqueous solution of phosphoric acid from the last mentioned calcium sulfate precipitate.

2. A process for the preparation and purification of phosphoric acid, comprising (a) reacting calcium phosphate with an aqueous solution of sulfuric acid at temperatures within the range of from 50° to 110° C. to produce a suspension of calcium sulfate in phosphoric acid containing from 250 to 450 grams of $P_2O_5$ per liter, the sulfuric acid being reacted in an amount such that said suspension contains from 10 to 50 grams per liter of sulfuric acid;

(b) separating a solution containing impure phosphoric acid from the calcium sulfate precipitated during the reaction in step (a);

(c) admixing said solution with
(1) a calcium compound selected from the group consisting of lime, calcium carbonate and tribasic calcium phosphate in an amount at least equal to the stoichiometric quantity required for reaction with the sulfuric acid present in said solution to produce calcium sulfate, and (2) a precipitating agent comprising crystalline calcium sulfate dihydrate in an amount of at least 50 grams per liter of said solution;

(d) agitating the resulting mixture and simultaneously cooling the same to, and maintaining the temperature within, the range of from 0° to 50° C. to precipitate calcium sulfate therefrom; and (e) separating the resulting purified aqueous solution of phosphoric acid from the last mentioned calcium sulfate precipitate.

3. The method as defined in claim 2, in which the calcium compound (1) admixed with said first mentioned phosphoric acid containing solution in step (c) is admixed with said solution in an amount such that the weight ratio of the sulfuric acid in said solution to the calcium oxide content of said calcium compound is from 0.5–1.75 to 1, and in which the precipitating agent (2) admixed with said solution is constituted of from 50 to 100 grams of crystalline calcium sulfate dihydrate per liter of the solution.

4. The process as defined in claim 2, in which the reaction mixture agitated in step (d) is stirred for a period of from 1 to 3 hours while being maintained at a temperature of from 10° to 40° C. to precipitate calcium sulfate therefrom and thus purify the resulting aqueous phosphoric acid solution.

5. The process as defined in claim 2, in which said precipitating agent is constituted of crystalline calcium sulfate dihydrate in admixture with an alkali metal fluosilicate.

References Cited in the file of this patent
UNITED STATES PATENTS

| | | |
|---|---|---|
| 1,787,192 | Fiske | Dec. 30, 1930 |
| 1,902,648 | Larsson | Mar. 21, 1933 |
| 2,003,051 | Knox | May 28, 1935 |
| 2,049,032 | Weber et al. | July 28, 1936 |
| 2,106,223 | Nordengren | Jan. 25, 1938 |